United States Patent [19]
Vetter

[11] 3,848,492
[45] Nov. 19, 1974

[54] APPARATUS FOR LONGITUDINALLY SEPARATING SERIALLY PRODUCED SYNTHETIC-RESIN PACKAGES

[75] Inventor: Artur Vetter, Gronenbach, Germany

[73] Assignee: Multivac Sepp Haggenmuller KG, Wolfertschwenden/Allgau, Germany

[22] Filed: Feb. 2, 1973

[21] Appl. No.: 329,204

[30] Foreign Application Priority Data
Feb. 4, 1972 Germany............................ 2205233

[52] U.S. Cl............................ 83/99, 83/629, 83/639
[51] Int. Cl................................................ B26d 7/06
[58] Field of Search....... 83/99, 625, 626, 629, 639, 83/566

[56] References Cited
UNITED STATES PATENTS
2,389,531  11/1945  Neale................................... 83/625
3,685,251  8/1972   Mahaffy et al................... 83/566 X Primary Examiner—Willie G. Abercrombie
Attorney, Agent, or Firm—Karl F. Ross; Herbert Dubno

[57] ABSTRACT

Rows of packages formed on a continuous band emerging stepwise from a packaging machine pass between an upper fixed cutter beam and a vertically reciprocal lower beam. The upper beam is a channel which carries a plurality of in-line straight blades that lie transverse to the direction of package advance, and a plurality of short curved blades that are, at one end, tangentially disposed with respect to the straight blades and continuations thereof, and at their other ends are tangent to the longitudinal direction. The lower beam has a flat upper surface which, when raised comes up against the cutter beam so as to chop the band of packages through, with the curved blades giving them rounded corners Pneumatically operated knockouts are provided to ensure removal of the cut-off corner portions, and means is provided for blowing the thus-removed portions away.

11 Claims, 6 Drawing Figures

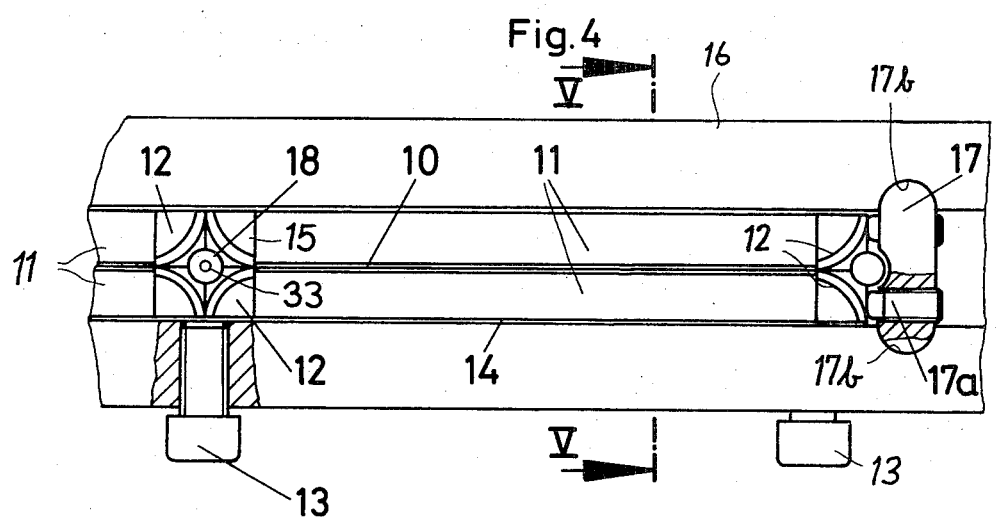
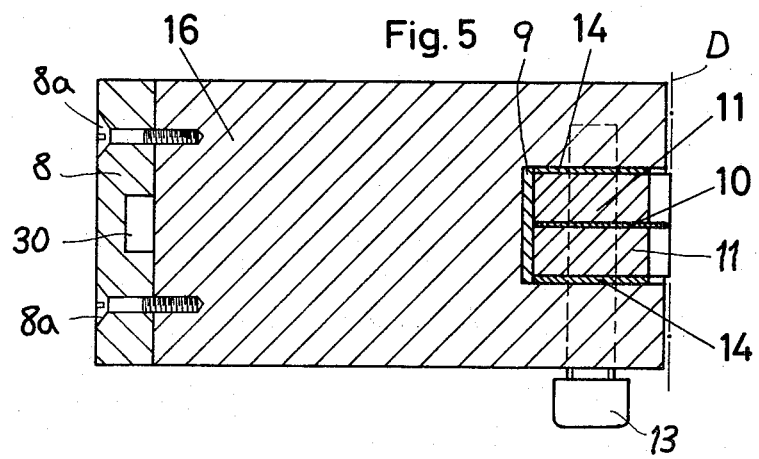
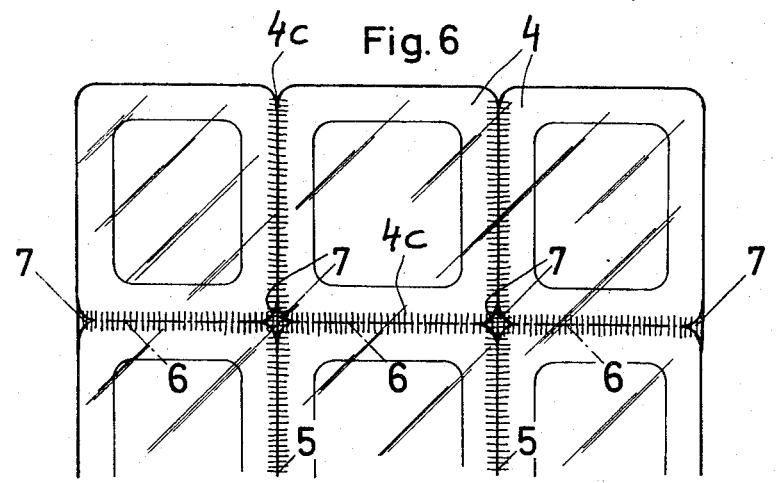

APPARATUS FOR LONGITUDINALLY SEPARATING SERIALLY PRODUCED SYNTHETIC-RESIN PACKAGES

FIELD OF THE INVENTION

The present invention relates to an apparatus for making separate packages from a pair of synthetic-resin foils. More specifically this invention relates to an apparatus for longitudinally separating serially produced synthetic-resin packages.

BACKGROUND OF THE INVENTION

An increasingly popular method of packaging foodstuffs and the like is in individually selaed synthetic-resin packages. These packages are produced by first deep drawing a plurality of pockets in a web of a suitable thermoplastic resin, such as high-density polyethylene. The foodstuff or other commodity is then charged into the pockets and another such band is laid over the pockets, with the pockets evacuated or filled with an inert gas. Then the two bands are welded together between the pockets by any of several methods well known in the art.

A problem in such packaging is the separation of the packages from one another. As a general rule a plurality of pockets are formed in a row extending transversely across the entire width of the lower synthetic-resin band or sheet. In bands of a width of from 250 mm to 450 mm from one to 10 such pockets can be formed, depending on the size of the item to be packaged. Little difficulty is encountered in subdividing the strip transversely by slitting it into the requisite number of sections longitudinally, but longitudinal subdivision is often more difficult, extreme precision being absolutely necessary to locate the cut within the weld.

When the rows are simply slit straight across transversely, which is the most common method, the individual packages are left with sharp corners that can injure personell handling them or can puncture other packages, this problem being quite bothersome when stiff sheets or webs are used. Some attempt has been made to cut the individual packages apart by stamping, at the same time rounding the corners, but such devices have always been either too slow to be economical or too complicated, or hard to adapt to different package arrangements.

OBJECTS OF THE INVENTION

It is therefore an object of the present invention to provide an improved packaging apparatus for the purposes described.

Another object is the provision of an improved apparatus which longitudinally subdivides a synthetic-resin band formed with a plurality of separate packages.

Yet another object is to provide such a web subdivider which can be adapted to different package layouts with a minimum of difficulty.

SUMMARY OF THE INVENTION

These objects are attained according to the present invention in which the continuous band of synthetic resin formed with a plurality of packages is cut across transversely by a blade carried by a horizontal fixed upper beam. This blade is formed with a plurality of in-line straight sections and, at each end of each straight section, with two oppositely curved arcuate sections forming a rhombus or half rhombus with outwardly concave sides. The curved sections are several small blades tangential to the transversely extending cut line and also tangential either to the longitudinal cuts or edges of the strip. Thus the curved blades cut the corners off the packages, leaving them round, and the straight blades separate the band longitudinally.

According to another feature of this invention, a lower counter beam is vertically displaceable up against the cutting edges of the blades on the upper beam. Thus it is possible to change the upper beam without having to disconnect the drive for the apparatus since this drive operates the lower beam which has a planar upper surface that can cooperate with a cutter of virtually any configuration, as long as the cutting edges are all also coplanar.

In accordance with yet another feature of the present invention the upper cutter beam is provided with at least two fluid-operated arrangements for knocking out the pieces cut off the corners of the packages, and for removing these pieces from the lower beam surface. A vertically reciprocal table pneumatically operated piston is loosely received in a bore terminating on the lower face of the cutter beam within the closed quadrilateral figure formed by the quarter-cylindrical blades that serve to round off the corners. This piston can be actuated to punch out the pieces cut free at the corners, since the use of a blade coacting with a flat surface rarely gives a perfect cut. Air leaking out around the piston rod serves to blow away the thus cut-off and punched-out portions. The corner cutters have corners or vertices lying at the corners of a square but, instead of straight sides, have outwardly concave curvilinear sides imparting a quadricuspid configuration to the cutter. The longitudinal and transverse linear blades are tangent to the circles of which the curved blade portions are segments. The curved blade portions lie, therefore, along cylinders having axes located outside the imaginary square outline described above but at the corners of a larger square and perpendicular to the plane of the cover web.

DESCRIPTION OF THE DRAWING

The above and other objects, features, and advantages of the present invention will become more readily apparent from the following description, reference being made to the accompanying drawing in which:

FIG. 4 is a bottom view of the cutter of the FIG. 1 apparatus, in enlarged scale;

FIG. 5 is a section taken along line V—V of FIG. 4; and

FIG. 6 is a top view of a plurality of packages as they emerge from the package filling and closing apparatus of FIG. 1 prior to longitudinal subdivision.

SPECIFIC DESCRIPTION

Figure 1:
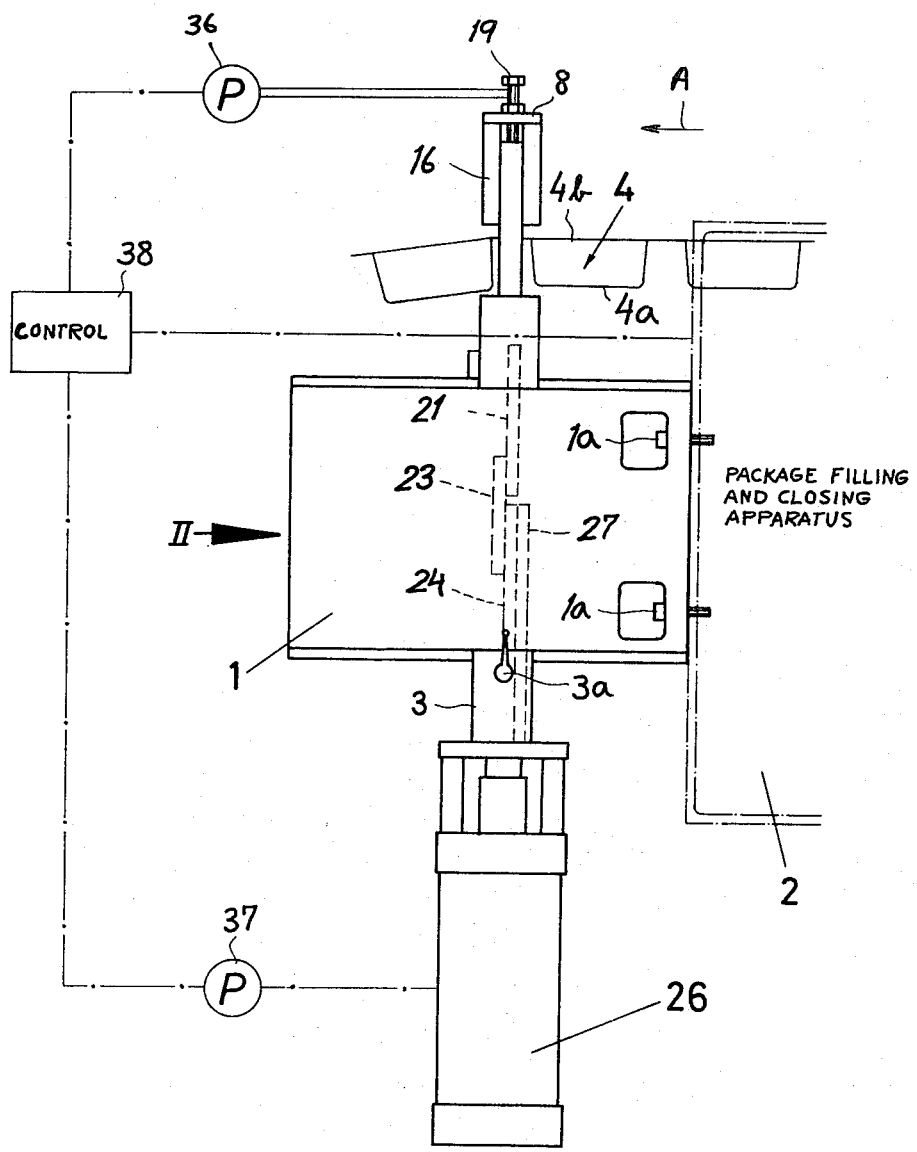
FIG. 1 is a side view of the apparatus according to the present invention.

As shown in FIG. 6, a plurality of packages 4 emerge from a device 2 such as described in U.S. Pat. Nos. 3,347,011; 3,129,545, and 3,524,298. Each package 4 comprises a lower sheet 4a in which a pocket is formed by deep drawing and filled with a commodity to be packaged, such as a foodstuff. A planar top sheet 4b is applied over the top of the bottom sheet and these two sheets, which are of a thermoplastic synthetic-resin such as high-density polyethylene, are welded together between the pockets as shown at 4c. If desired the pockets can be partially evacuated or filled with an inert gas for protection of the packaged foodstuff. Such packages are formed serially in rows three abreast, as shown in FIG. 6, with two longitudinal cuts 5 being made in the sheets 4a and 4b in the welds 4c to subdivide them transversely into three coextensive bands of packages 4.

The apparatus according to the present invention serves to separate the packages from each other longitudinally by making transverse cuts along lines 6, while simultaneously rounding the corners by cutting out small three-sided pieces 7.

As shown in FIG. 1 the device 2 is provided at its downstream end with a pair of plates 1 which are secured to it by screws 1a and extend parallel downstream in the direction A of advance of the packages 4. These plates have beveled edges allowing a pair of clamping plates 3 provided with screws 3a to secure a pair of frame uprights 28 interconnected by a crosspiece 27 anywhere along the plates 1. Since the packages 4 emerge stepwise from the device 2, the cutting apparatus according to the present invention is secured at a position along the guides 1 where it can cut between two following packages 4 each time they stop.

FIGS. 4 and 5 show the cutter of the apparatus of this invention in more detail. It basically comprises a U-section metal beam 16 which receives three pairs of like bars 11 that each embrace a blade 10 formed of a steel strip whose edge has been sharpened. Hardened shim bars 14 to either side of the bars 11 and a shim strip 9 under them and the blade ensure a snug fit of these elements in the channel 16, while screws 13 serve to clamp all these elements in place. At each end of each bar 11 there is a block 15 of steel formed with a respective quarter-circular blade 12 forming a quadricuspidal rhombus or hypocycloid of the shape of two regions 7 (FIG. 6) to be cut out between the packages so that they have no sharp corners. The cutout region could be a simple rhombus with straight sides, but the concave sides give the best rounded effect. Two such blocks 15 with blades 12 are arranged at each end of the cutting unit 16 to round the corners, these blades 12 again being tangential to the in-line blades 10. All of the cutting edges of the blades 10 and 12 are coplanar. The elements 9, 10, 11, 12, and 14 are also held in place by two retainers 17 received in respective pairs of notches 17b in the beam 16 and each carrying two allen screws 17a which can be screwed in to bear on the end blocks 15 and clamp all of these elements together.

The rear of the beam 16 is secured by screws 8a to a plate 8 which is fastened at both ends to the uprights 28 by means of two adjustment screws 19 and 20, the former (pressure screws 19) pushing the plate 8 away from the supports 28 and the latter (traction screws 20) pulling it in so that it can be exactly positioned and locked in place. It is important that the plane P of the blades 10 and 12 lie just slightly above and parallel to the upper foil 4b.

Figure 2:
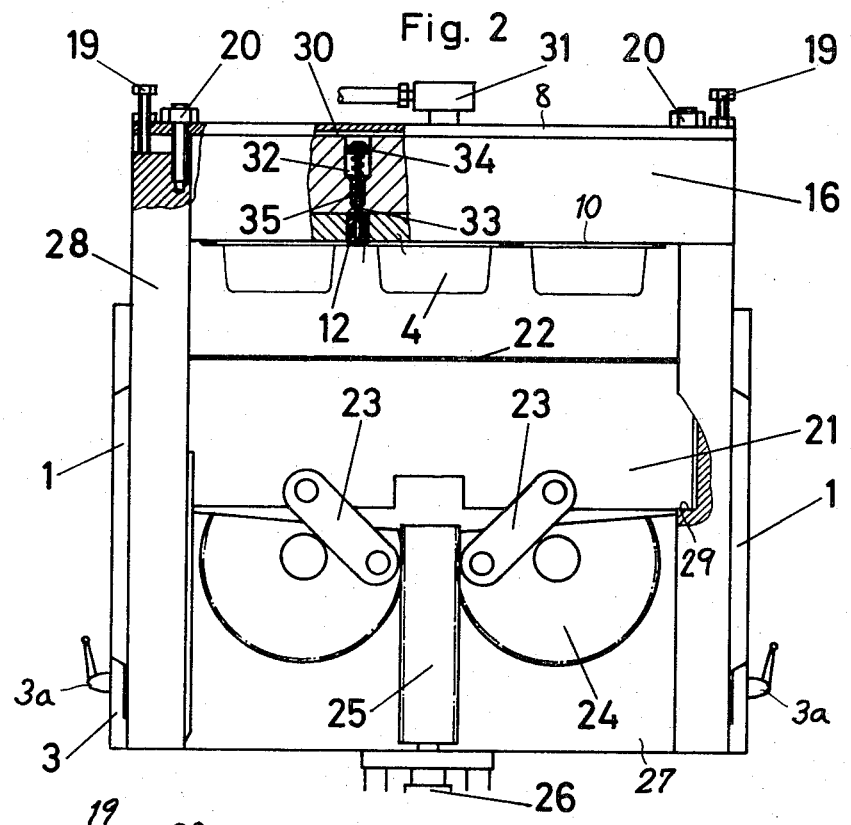
FIG. 2 is an end view taken in the direction of arrow II of FIG. 1.
Figure 3:
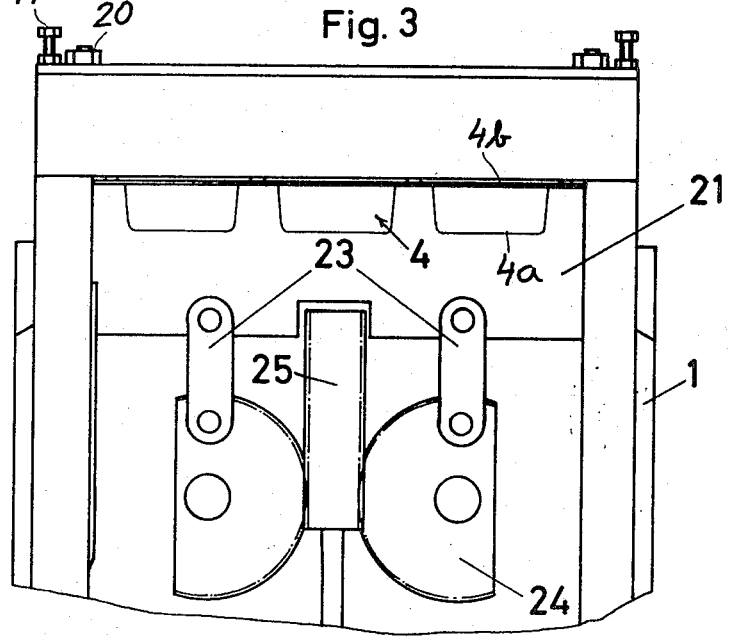
FIG. 3 is a view similar to FIG. 2 showing the device in its closed position.

The foils 4a and 4b are cut along lines 6 and sections 7 are removed by pushing these foils up against the blades 10 and 12 with a vertically reciprocal beam 21 having a hardened steel upper edge 22. This beam 21 is horizontal and parallel to the plate P at all times, and rides in slots 29 formed in the frame 28. A drive comprising a pneumatic cylinder 26 mounted on the traverse 27 and carrying on its piston rod a vertically reciprocal two-edged rack 25 each side of which meshes with a respective toothed sector wheel 24 pivotal on the crosspiece. Connecting rods 23 connected at one end eccentrically on the wheels have their other ends pivoted on the beam 21. The wheels 24 are rotated in opposite directions by the rack 25 and the rods 23 lean in opposite directions so that lifting of the rack from the down position shown in FIG. 2 to the up position of FIG. 3 raises the beam 21, bringing the planar edge 22 just into contact with the cutting edges of blades 10 and 12.

A controller 38 connected to the packaging machine 2 operates a pump 37 connected to the beam 21 each time this controller receives a signal indicating that the concatenation of packages 4 is still. The rack 25 raises and thereby rotates the two wheels 24 to lift the beam 21 very evenly, much more evenly than if it were just carried on the piston rod, so as to force the welds 4c against the blades and chop the packages from each other longitudinally.

The plate 8 is formed with a groove 30 extending almost to the ends of the beam 16. A connection 31 is provided on this plate 8 for pressurizing the chamber formed by groove 30 with air from a pump 36 also controlled by the controller 38. Four pistons 34 are reciprocal in four respective stepped bores 32 which extend from the channel 30 through the beam 16 and through blocks 15 and retainers 17 to the bottom of the cutter unit. A rod 33 connected to each piston is surrounded by a compression spring 35 which bears at one end on the piston 34 and at the other end on a sleeve 18 formed in the continuation of the bore 32 in the blocks 15 and loosely receiving the rod 33. This spring urges the piston 34 upwardly. The piston rods can be made to project beyond the plane P by pressurization of their cylinders and are positioned inside the quadricuspidal hypocycloids formed by the blades 12 or the half hypocycloids at the edges so as to dislodge the scraps 7 after they are cut by the blades 12. Thus, as soon as the beam 21 is fully raised the pump 36 is started to pressurize the chambers above the pistons 34, then as the beam 21 is lowered the piston rods 33 press down against the pieces 7 to be dislodged and separate them from the foils 4a and 4b. The beam 21 then pulls completely away from the lower ends of the rods 33 and fluid pressure to them is cut off. The springs 35 return the pistons 34 to their up positions, and air escaping around these pistons and out through the bottom of the bore 32 serves to blow the scraps 7 off the beam 21. The next three packages are then advanced past the beams 16 and 21 and the operations described above are repeated.

The apparatus described above functions smoothly, cleanly cutting the packages apart and cutting their corners off. The synthetic-resin scraps are removed from the apparatus automatically. Furthermore it is possible to adjust the device for packages of any size, and any practical weight of synthetic-resin sheet or foil can be severed with no difficulty. Unscrewing of the screws 20 and the connection of the air supply at 31 allows the cutting unit 16 to be switched with another cutting unit for use when the packages arrive two or four or more abreast instead of three abreast. In any case the lower cooperating beam 21 need not be changed since it can cooperate with virtually any straight blade pattern.

I claim:

1. In combination with a machine that produces a continuous synthetic-resin band that emerges longitudinally and stepwise from the machine and is formed with a plurality of longitudinally spaced packages, an apparatus comprising:

a frame longitudinally downstream of said machine;

an upper cutter beam fixed on said frame and provided with a cutting element having at least one straight section extending transverse to the longitudinal direction of displacement of said packages and at each end of said straight section two oppositely curved sections each tangential to and forming a continuation of said straight section, said sections having cutting edges lying in a common plane;

a vertically displaceable lower cutter beam on said frame having a planar upper surface parallel to said plane;

means for lifting said lower beam to transversely sever said band between two of said packages by chopping same between said beam and said cutter element and for lowering said lower beam to allow at least one more package to advance between said beam;

at least two pneumatic cylinders formed in said element between said curved sections;

respective pistons in said cylinders having piston rods displaceable out of said cutting element below said plane;

means biasing said pistons into a position with said rods above said plane; and means for applying fluid pressure to said pistons to push them down and thereby engage said rods against portions of said band cut free by said curved sections.

2. The apparatus defined in claim 1 wherein said band is formed with transverse courses of at least two packages separated from each other by a longitudinal cut line, said cutting element having at least two such straight sections in line with each other and having inner ends turned toward each other, and extending from each of said inner endss a pair of such oppositely curved sections tangent to and continuing the respective straight section and also tangent to a longitudinally extending line corresponding to said cut line.

3. The apparatus defined in claim 2 wherein said curved sections are arcuate and said curved sections at said inner ends form a closed four-sided outwardly concave figure.

4. The apparatus defined in claim 3 wherein said figure is a quadricuspidal rhombus.

5. The apparatus defined in claim 2 wherein said upper beam comprises a transversely extending and downwardly open channel receiving said cutting element and means on said channel for clamping said element in place.

6. The apparatus defined in claim 5 wherein said element is formed by a plurality of blades each constituting one of said sections and by a plurality of spacers between said blades and said channel.

7. The apparatus defined in claim 2, further comprising means for releasably securing said upper beam on said frame.

8. The apparatus defined in claim 2 wherein said means comprises a fluid cylinder, a rack carried on said cylinder and reciprocal thereby, a pair of sector wheels meshing with said rack and pivotal on said frame, and a pair of connecting rods eccentrically connected at one end to said sectors and at their other ends to said lower beam.

9. The apparatus defined in claim 1 wherein said cutting element is formed with bores constituting said cylinders and loosely receiving said pistons such that pressurized air can escape out of said cylinders around said rods to blow away said portions.

10. The apparatus defined in claim 1, further comprising pressure screws and traction screws adjustably mounting said upper beam on said frame.

11. In an apparatus for severing individual packages from a succession of transversely spaced groups of packages emerging on a synthetic-resin foil band in which the packages are integrally formed in a packaging machine and are previously separated transversely by at least one longitudinal cut through the foil, the improvement which comprises in combination:

a support on one side of said band and juxtaposed therewith;

at least two mutually aligned straight blades on said support extending transversely on said band for separating successive packages on each side of the longitudinal cut;

a pair of oppositely curved quarter-circular blades on said support at each end of each of said straight blades for imparting radiused quarters to the individual packates;

means on said support for adjusting said quarter-circular blades so that the cutting edges thereof lie substantially tangential to the cutting edges of the respective straight blades; and a member provided with a planar surface juxtaposed with said foil on the opposite side thereof, said support and said member being relatively displaceable to drive said blades through said foil and sever the packages from said band, said support being a fixed upper beam and each of said straight blades is disposed between a pair of support bars in a recess formed in said beam, said means for adjusting said quarter-circular blades including a block bearing upon said quarter-circular blades and traction screws bearing up on said block.

* * * * *